United States Patent [19]
Wyatt

[11] Patent Number: 6,000,283
[45] Date of Patent: Dec. 14, 1999

[54] TESTING DEVICE FOR OIL FLOW PROBLEMS IN JET ENGINES

[75] Inventor: Robert W. Wyatt, Tucson, Ariz.

[73] Assignee: The United States of America as represented by the Secretary of the Air Force, Washington, D.C.

[21] Appl. No.: 08/933,560

[22] Filed: Sep. 19, 1997

[51] Int. Cl.$^6$ .................................................. G01M 15/00
[52] U.S. Cl. ............................................................ 73/117.2
[58] Field of Search ................................... 73/116, 117.2, 73/117.3, 117.4

[56] References Cited

U.S. PATENT DOCUMENTS

| | | |
|---|---|---|
| 3,723,987 | 3/1973 | Barone, Jr. et al. . |
| 3,751,661 | 8/1973 | Packer et al. . |
| 4,116,052 | 9/1978 | Paluka ..................................... 73/117.3 |
| 4,402,180 | 9/1983 | Reid et al. . |
| 4,757,878 | 7/1988 | Iino et al. ................................ 73/53.05 |
| 4,821,217 | 4/1989 | Jackson et al. ......................... 73/117.2 |
| 5,408,412 | 4/1995 | Hogg et al. ............................. 73/117.2 |

*Primary Examiner*—Eric S. McCall
*Attorney, Agent, or Firm*—Robert L. Nathans

[57] ABSTRACT

The testing device is mounted on a portable stand so that it is easily placed near the aircraft engine to be tested. A source of pressure air is further required for the testing device. A portable source or a shop source is sufficient. The testing device has an output hose connected to a selected port for testing a gear box, sump, etc. The air pressure is adjusted going into the selected port and then the flow of air is measured. The reading obtained therefrom is then compared to a predetermined standard for that particular section to determine if there is a problem therein. If the problem is detected then corrective action is taken to eliminated the problem. This procedure is applied to as many ports as necessary to find the oil pressure problem.

4 Claims, 2 Drawing Sheets

TESTING DEVICE FOR OIL FLOW PROBLEMS IN JET ENGINES

STATEMENT OF GOVERNMENT INTEREST

The invention described herein may be manufactured and used by or for the Government for governmental purposes without the payment of any royalty thereon.

BACKGROUND OF THE INVENTION

The present invention relates to aircraft jet engines, and, in particular, relates a testing device to determine the location of oil flow problems.

Presently, aircraft jet engines, like other engines using oil as a lubricant, only have one detector for sensing oil pressure problems whether low or high. As a result, it is not possible to locate the area where the problem is occurring. There may be multiple sumps and gear boxes, etc. Thus in the past, if a problem was detected, the whole engine is removed for repair and each particular area was inspected to determine the source of the problem. A filter screen may be blocked with material, a gear badly worn or a bearing badly worn. This process is very time consuming in that the whole engine had to be removed from the aircraft and then taken down section by section for inspection.

Thus, there exists a need for a testing device for locating oil flow problems in jet engines.

SUMMARY OF THE INVENTION

The present invention is a testing device for finding oil pressure problems in aircraft jet engines.

The testing device is mounted on a portable stand so that it is easily placed near the aircraft engine to be tested. A source of pressure air is further required for the testing device. A portable source or a shop source is sufficient. The testing device has an output hose connected to a selected port for testing a gear box, sump, etc. The air pressure is adjusted going into the selected port and then the flow of air is measured. The reading obtained therefrom is then compared to a predetermined standard for that particular section to determine if there is a problem therein. If the problem is detected then corrective action is taken to eliminated the problem. This procedure is applied to as many ports as necessary to find the oil pressure problem.

Therefore, one object of the present invention is to provide a testing device that uses compressed air to determine the source of oil pressure problems.

Another object of the present invention is to provide a testing device that is easily moved from jet engine to jet engine.

Another object of the present invention is to provide a testing device that has a minimum of controls.

Another object of the present invention is to provide a testing device that can isolate the oil pressure problem to a particular area of the engine.

Another object of the present invention is to provide a testing device that can test the engine while mounted within the aircraft.

These and many other objects and advantages of the present invention will be ready apparent to one skilled in the pertinent art from the following detailed description of a preferred embodiment of the invention and the related drawings.

DESCRIPTION OF THE PREFERRED EMBODIMENT

Figure 1:
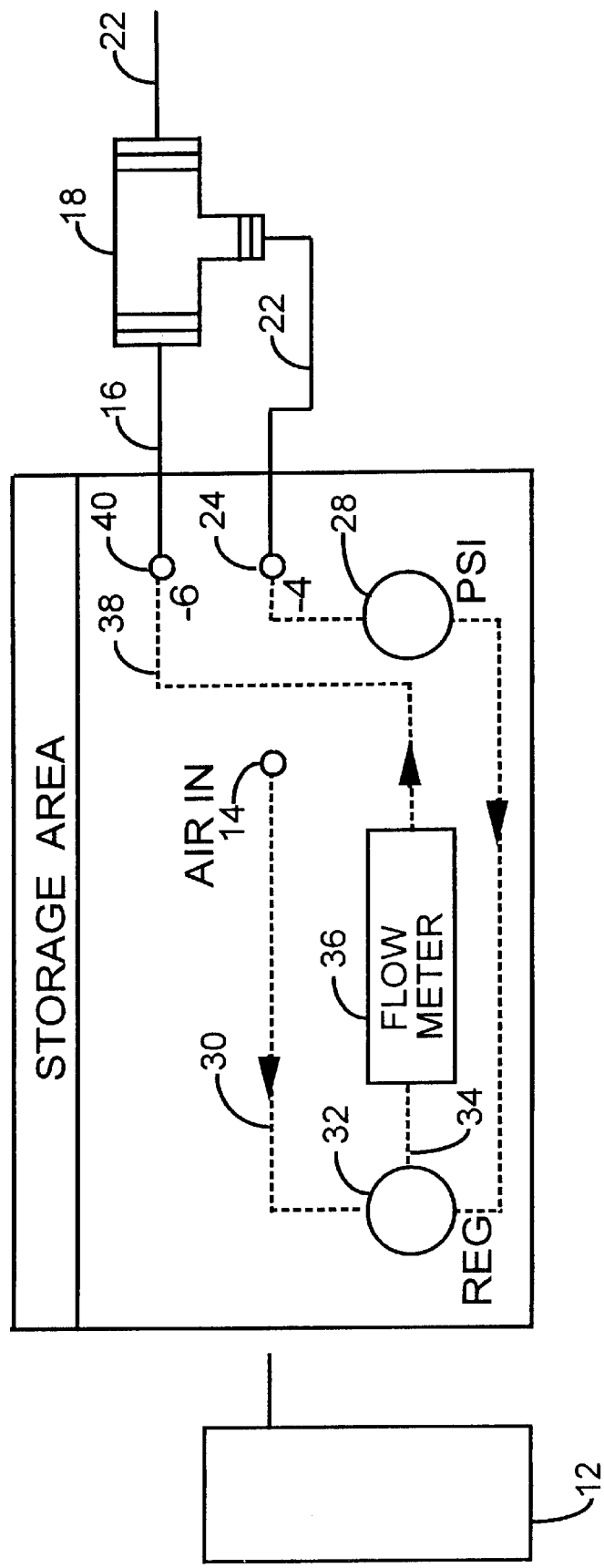
FIG. 1 illustrates by block diagram the testing device of the present invention.

Referring to FIG. 1, a testing device 10 is shown that is used to provided a controlled flow of pressurized air to a selected input to be further discussed. The testing device 10 is mounted on a portable stand, not shown. A source of compressed air 12 being either a portable source or a shop source is connected to the air input 14. A compressed air first output line 16 is connected to a T 18 and thereafter to a compressed air second output line 20. A pressure monitoring line 22 returns to the testing device 10 and is connected onto an input 24. An air line has a PSI meter 28 therein. An air line 30 from the air input 14 is connected into a pressure regulator 32. A further air line 34 connects into a flow meter 36. A air line 38 from the flow meter 36 connects into the output port 40.

The psi gauge should range from 0 to 50 or 0 to 100 psi whichever is available. The flow meter was a Universal Flow Monitor with a range from 0 to 50 PPH.

Figure 2:
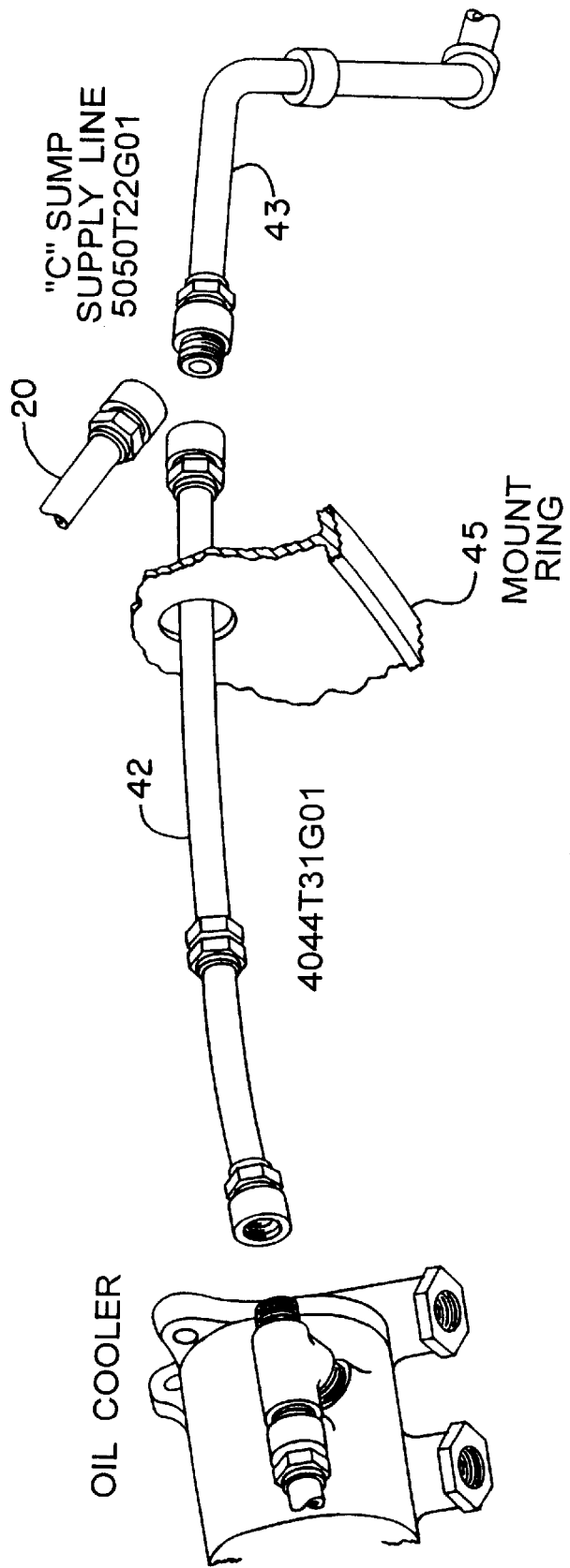
FIG. 2 illustrates separating a sump supply line on a conventional jet aircraft engine wherein an air pressure input hose is connected coming from the testing device.

Referring to FIG. 2, the second output line 20, for example, may be connected into a sump supply line 42 at a point where the line 42 can be disconnected. In this example, line 42 comes from an oil cooler. For example, in the jet engine TF34-100A there are 5 points for testing. One accessory gear box and three sumps. If there is an oil pressure problem, each area would be tested by connecting line 20 to an appropriate input source.

The following are examples of the test procedures followed:

"C" Sump a. Disconnect the oil supply line 42 to "C" sump at the "T" fitting on the oil cooler and at line 43 aft of the mount ring 45. Move the line 43 forward enough to clear installation of the line 20 from the testing device 10;

b. Connect the line 20 to line 43;

c. At the regulator valve 32 adjust the air pressure to 20 psi and allow to flow 1 minute before taking reading;

d. Record the reading from the flow meter 36;

e. At the regulator valve 32 adjust the air pressure to zero; and f. Disconnect the testing device from the line 43 and reconnect all the hardware.

On the Accessory Gear Box, not shown:

a. At the elbow in the front of the gearbox connect the line 20 thereto;

b. On the aft side of the gearbox at the oil pump, disconnect the oil supply hose at the elbow and cap the elbow;

c. At the regulator valve 32 adjust the air pressure to 20 psi and allow to flow 1 minute before taking reading;

d. Record the reading from the flow meter 36;

e. At the regulator valve 32 adjust the air pressure to zero; and f. Disconnect the testing device from the gearbox and reconnect all the hardware.

After the testing is completed, for example, the reading, depending on the source, should be as follows:

"C" Sump 17.5 to 20 PPH (pounds per hour)

Acc. Gearbox 30 to 36 PPH

Clearly many modifications and variations of the present invention are possible in light of the above teachings and it is therefore understood, that within the inventive scope of the inventive concept, that the invention may be practiced otherwise than specifically claimed.

What is claimed is:

1. A testing device for locating a source of low or high oil pressure in an aircraft jet engine, said jet engine having multiple sources of oil pressure, said jet engine having only one oil pressure detector being unable to locate said source, said testing device comprising:

a container, said container being portable;
   said container having therein:
   a pressure regulator, said pressure regulator being connectable to an external source of compressed air;
   a flow meter, said flow meter being connected to said pressure regulator;
   a PSI indicator, said PSI indicator connected to said pressure regulator and to an input;
   an external "T" coupling, said external "T" coupling having a first compressed air line connected thereto from an output of said container, a second compressed air line connected to said external "T" opposite said first compressed air line and further connected by a coupling to a selected input to said jet engine, and a pressure monitoring line connected to said external "T" at a base and to said input of said PSI indicator.

2. A testing device as defined in claim 1 where said multiple sources include at least one sump and at least one accessory gearbox.

3. A testing device as defined in claim 1 wherein said flow meter ranges from 0 to 60 pph.

4. A testing device as defined in claim 1 wherein said psi indicator ranges from 0 to 100.

* * * * *